United States Patent Office 3,178,942
Patented Apr. 20, 1965

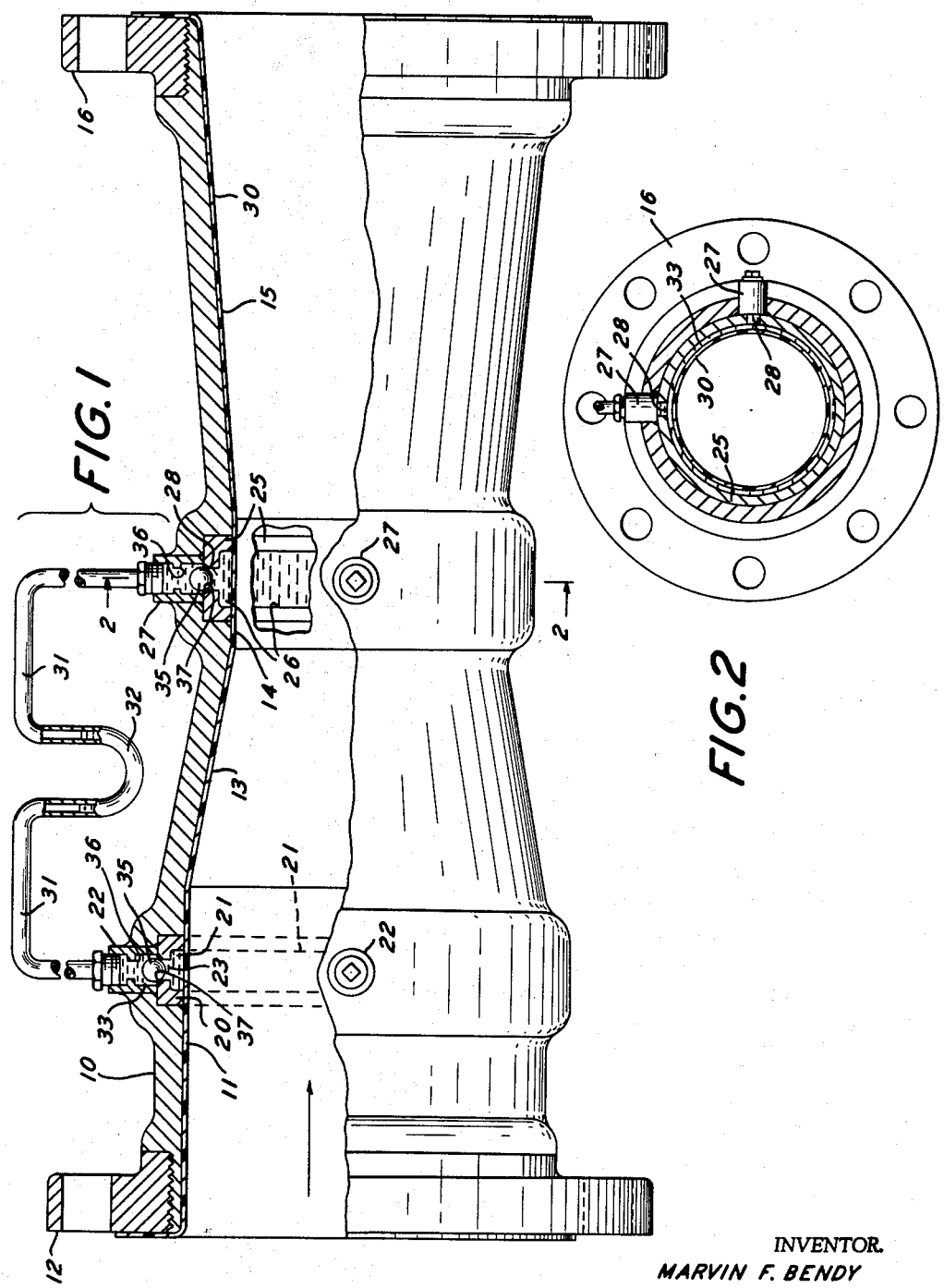

3,178,942
PRIMARY METERING DEVICES
Marvin F. Bendy, Haddonfield, N.J., assignor to Penn Meter Company, Philadelphia, Pa., a corporation of Pennsylvania
Filed Feb. 16, 1962, Ser. No. 173,662
6 Claims. (Cl. 73—213)

This invention relates to primary metering devices and more particularly to flow metering tubes of the Venturi type.

Difficulties have heretofore been encountered in metering sewage, sludge and slurries or fluid carrying solids in suspension. These difficulties have arisen particularly because of the difficulty of pressure takeoff since the pressure take off openings tend to become clogged or stopped by solid materials.

It is the principal object of the present invention to provide a metering tube which is particularly suitable for metering liquids carrying solids in suspension, for metering slurries and for metering sewage, sludge and the like.

It is a further object of the present invention to provide a metering tube having simple but effective provisions for pressure take off at the upstream and restricted sections of the tube.

It is a further object of the present invention to provide a metering tube in which the pressure takeoff connections are shielded from the contents of the fluid whose flow is being metered.

It is a further object of the present invention to provide a metering tube which is particularly suited for measuring the flow of corrosive fluids, which fluids do not contact the differential pressure responsive takeoff devices or the measuring instruments.

It is a further object of the present invention to provide a metering tube for fluid flow having a simple but effective interior construction for pressure takeoff without transfer to the exterior of any of the fluid whose flow is being measured.

It is a further object of the present invention to provide a metering tube in which the contents of the tube are effectively retained so that there is no discharge or delivery from the metering tube to the pressure responsive instrument of the metered fluid.

Other objects and advantageous features of the invention will be apparent from the description and claims.

The nature and characteristic features of the invention will be more readily understood from the following description taken in connection with the accompanying drawings forming part thereof, in which;

FIGURE 1 is a view partly in section and partly in elevation showing a metering tube in accordance with the present invention; and FIG. 2 is a transverse sectional view taken approximately on the line 2—2 of FIG. 1.

It should, of course, be understood that the description and drawings herein are illustrative merely, and that various modifications and changes can be made in the structure disclosed without departing from the spirit of the invention.

Referring now more particularly to the drawings, in the embodiment of the invention therein illustrated, a metering tube is shown having a body 10 with an upstream section 11 of substantially uniform diameter with an end flange 12 for securing the same into the fluid line in which the measurement of flow is desired. Extending from the upstream section 11, a reducing section 13 is provided extending to a throat 14 of minimum cross section and less than that of the upstream section 11. Extending from the throat 14 a recovery section 15 is provided of increasing diameter with a terminal flange 16 thereon for connecting the metering tube into the fluid line. The upstream section 11, reducing section 13, throat 14 and recovery section 15 can be proportioned as is well known in the art. The metering tube 10 can be of any preferred material and advantageously of synthetic plastic reinforced to the extent desired.

At the location in the upstream section 11 at which the pressure takeoff is desired, the body 10 has rigidly secured therein an annular pressure takeoff ring 20 with its inner face flush with the interior of the upstream section 11 and with an interiorly facing annular space or groove 21 which preferably extends completely around the interior.

Pressure takeoff connections 22 are provided communicating through passageways 23 in the ring 20 with the annular space 21. The pressure takeoff connections 22 may be at any desired circumferential location and connections 22 at one quarter circumferential spacing have been found satisfactory.

At the location in the throat 14 at which the pressure takeoff is desired, the body 10 has rigidly secured therein an annular pressure takeoff ring 25 with its inner face flush with the interior of the throat 14 and with an interiorly facing annular space or groove 26 which preferably extends completely around the interior.

Pressure takeoff connections 27 are provided communicating through passageways 28 in the ring 25 with the annular space 26. The pressure takeoff connections 27 may be at any desired circumferential location and connections 27 at one quarter circumferential spacing have been found satisfactory.

Within the interior of the body 10 of the metering tube and preferably extending from a location in overlapping relation to the end of the flange 12 through the upstream section 11, the reducing section 13, the throat 14 and the recovery section 15, and extending in overlapping relation to the end face of the flange 16, a liner or sleeve 30 is provided. The liner 30 is preferably formed of rubber, natural or synthetic, which is cemented or otherwise secured to the interior face of the body 10 and to the rings 20 and 25, and with flexible portions in bridging relation to the annular spaces or grooves 21 and 26. For this purpose a sleeve 30 of Neoprene has been found satisfactory but any material having the desired flexibility where bridging the annular gaps or openings 21 and 26 may be used.

While the upstream pressure takeoff connections 22 may be connected together and the throat pressure takeoff connections 27 may be connected together, it is preferred to plug one of each of the connections 22 and 27 and the others of the connections 22 and 27 are then connected by piping 31 to opposed portions of a differential pressure responsive instrument 32 for indicating, recording or controlling. The instrument 32 can be a mercury manometer, a small displacement transducer, or a pressure responsive device having an expansible chamber bounded by a diaphragm or bellows.

The grooves 21 and 26 in the rings 20 and 25, and the spaces in the pressure takeoff connections 22 and 27, the piping 31 and in the pressure responsive portions of the instrument 32 exposed to the differential pressure are filled with an incompressible liquid 33 for differential pressure application from the pressure takeoff connections 22 and 27 at the instrument 32.

If desired each of the pressure takeoff connections 22 and 27 can be provided with a check valve therein for preventing fluid discharge in the event of rupture of the sleeve 30 or leakage in the piping 31 or instrument 32. For this purpose, a valve ball 35 can be employed seating upon fluid flow upon an upper valve seat 36 but normally seated upon a serrated seat 37 which permits fluid pressure transfer to and through the piping 31.

The upstream pressure at the portion of the sleeve 30 covering the groove or space 21 is effective and is transferred by the filling liquid 33 to and through the pressure takeoff connection 22 to the instrument 32 and the throat pressure at the portion of the sleeve 30 covering the groove or space 26 is effective and is transferred by the filling liquid 33 to and through the pressure takeoff connection 27 to the instrument 32.

No delivery at the upstream section 11 or throat 14 of the contents of the fluid whose flow is being measured can occur, the fluid being confined and directed by the sleeve 30. No clogging of the takeoff connections 22 or 27 by solids content of the fluid can occur.

I claim:

1. A primary metering device for fluid flow comprising a flow metering body with an interior fluid passageway having an upstream section and a throat of reduced cross section providing a pressure differential with respect to the upstream section, said body at said upstream section having an opening formed therein facing said passageway with a pressure takeoff connection with which said opening is in communication, said body at said throat having a second opening formed therein facing said passageway, a pressure takeoff connection communicating with said second opening, a flexible non-metallic liner for said body extending respectively beyond said openings in both directions having portions in bridging relation to said openings, said openings and takeoff connections having an incompressible liquid therein for pressure transfer from the bridging portions of said liner.

2. A primary metering device as defined in claim 1 in which said openings extend circumferentially in said body around said passageway.

3. A primary metering device as defined in claim 1 in which at least one of said pressure takeoff connections has a check valve therein carried by said body and closing upon fluid discharge through the takeoff connection.

4. A primary metering device for fluid flow comprising a flow metering body having an interior passageway provided in sequential arrangement with an upstream section, a reducing section, a throat and a recovery section, said body at said upstream section having an annular space formed therein facing the interior of said body, said body at said throat having an annular space formed therein facing the interior passageway of said body, a non-metallic liner disposed in said body and extending without interruption from the entrance to the upstream section to the downstream end of the recovery section, said liner having portions in bridging relation to each of said spaces, said last portions being flexible for transfer of interior pressure at said upstream section and at said throat through said liner portions to said spaces.

5. A primary metering device as defined in claim 4 in which said spaces are liquid filled.

6. A primary metering device as defined in claim 4 in which at least one of said pressure takeoff connections has a check valve therein carried by said body closing upon fluid discharge through the takeoff connection.

References Cited by the Examiner

UNITED STATES PATENTS

| | | | |
|---|---|---|---|
| 1,671,580 | 5/28 | Greve | 138—44 |
| 1,699,075 | 1/29 | McNeill | 73—299 |
| 2,274,479 | 2/42 | Inderdohnen | 73—406 X |
| 2,369,707 | 2/45 | Baak | 73—406 X |
| 2,497,978 | 2/50 | Carlson | 138—44 |
| 2,517,820 | 8/50 | Aagaard. | |
| 3,142,988 | 8/64 | Love | 73—406 X |

FOREIGN PATENTS 305,602  6/19  Germany.

RICHARD C. QUEISSER, *Primary Examiner.*

ROBERT L. EVANS, *Examiner.*